3,362,852
FUEL CELL WITH CONSUMABLE FERROUS METAL ANODE
Sidney A. Corren, 163 Cherry St., Katonah, N.Y. 10536, and Myron A. Coler, 56 Secor Road, Scarsdale, N.Y. 10583
Filed Jan. 12, 1966, Ser. No. 520,103
5 Claims. (Cl. 136—86)

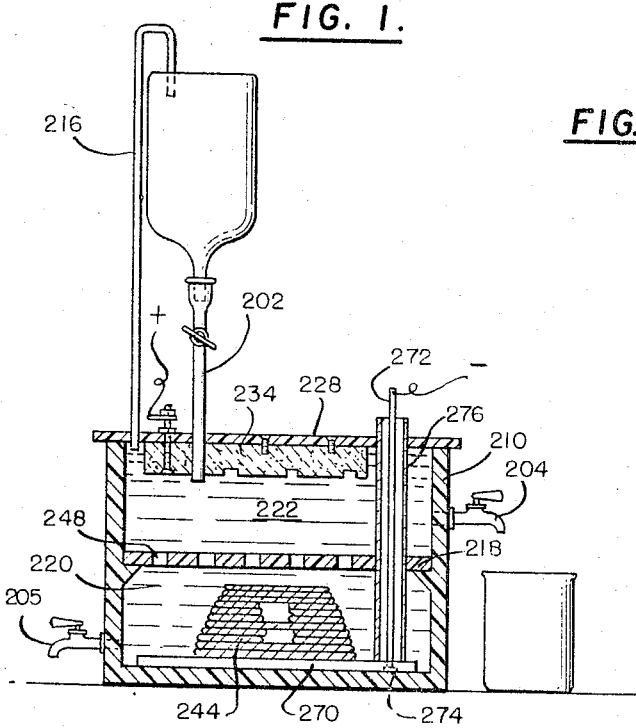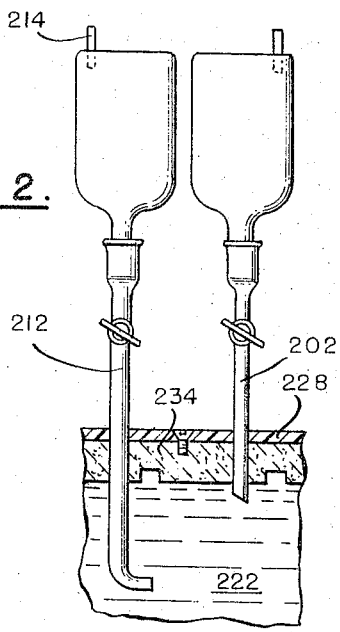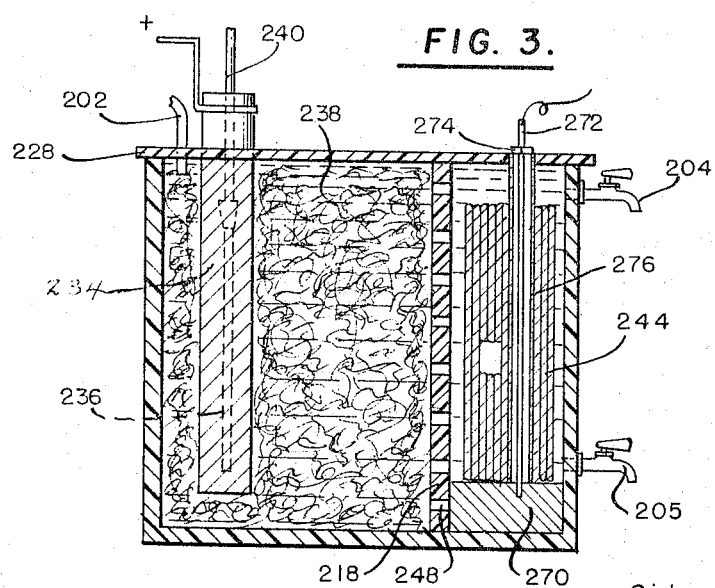

This application is a continuation-in-part of our copending United States patent application Ser. No. 392,412 filed Aug. 27, 1964, which was a continuation-in-part of United States patent application Ser. No. 84,535 filed Jan. 24, 1961, both now adandoned.

This invention relates to methods and apparatus for producing electricity either intermittently, upon demand, or continuously, and it relates particularly to apparatus wherein the electricity is produced as a result of chemical reactions effected at electrodes.

Systems wherein a fossil fuel is caused to combine with oxygen in an electrochemical reaction producing electricity constitute "fuel cells" in the classical sense. Present day usage has extended the term to encompass not only electricity generating systems in which carbon is caused to combine with oxygen but also systems in which hydrogen is caused to combine with oxygen or even any cell in which electricity is produced by an oxidation-reduction reaction in which the oxidant is continuously supplied at one electrode while the reductant is supplied at another electrode and the resultant products are continuously removed from the cell.

One object of this invention is to provide a fuel cell which operates from scrap fuel and which is characterized by a simplicity of construction and operation, high output and relatively long life.

Another object is to provide a fuel cell which is simple in construction and which operates silently and automatically at low temperatures and at atmospheric pressure and with essentially no heat evolution and no escape of dangerous gases and with no danger of explosion.

These and other objects are achieved by the fuel cell of the present invention, the essential elements of which are shown schematically in the drawings accompanying this application, in which:

FIGURE 1 is a schematic plan view in section of one embodiment;

FIGURE 2 is a fragmentary view illustrating another embodiment; and

FIGURE 3 is a schematic plan view in section of a third embodiment of the fuel cells of this invention.

In general the essential elements of the fuel cells comprise:
(1) An anode,
(2) A cathode,
(3) An electrolyte,
(4) Means for feeding the reactants into the cell and for removing the products of the reaction from the cell, and
(5) Various auxiliary means to facilitate operation of the cell.

The fuel cells shown schematically in FIGURES 1 to 3 have been successfully operated for long intervals of time utilizing a relatively plentiful and inexpensive solid material for the consumable anode.

The fuel cell comprises a vessel 210 made of glass, synthetic resin polymer such as polymethylmethacrylate, or other suitably inert electrically insulating material and is adapted to contain a liquid electrolyte. One or more anodes 244 are immersed in the liquid electrolyte. A cathode 234 secured to cover 228, an electrolyte inlet 202, and electrolyte outlet 204 complete the essential cell elements, except for the electrical leads.

A particularly preferred anode material for the cells shown comprises flattened "tin" cans or other ferrous scrap as the consumable anode material. The electrolyte may be any suitable ferric salt, such as the sulfate, or chloride, or oxalate, all of which have been successfully used. The preferred cathode material is graphite, notched as shown in FIGURE 1 to increase the cathode area. Other chemically inert materials may be used.

The iron scrap which serves as the consumable anode 244 is conveniently supported in the cell on a base 270 formed of chemically inert, electrically conductive material adapted to rest on the bottom of vessel 210, or on a base formed of a material such as steel which is electrochemically protected by the flattened tin cans. Base 270 is preferably secured to a vertical post 272 by a nut 274 or by welding. Post 272 which is electrically conductive, is kept from chemical or electrical contact with the electrolyte by a sleeve 276 of glass or other inert insulating material. Sleeve 276 extends through the cover 228 and through a perforated baffle plate 218 extending between the walls of vessel 210. Baffle plate 218 divides the cell along a horizontal or a vertical plane into a cathode compartment 222 and an anode compartment 220. Perforations 248 in the baffle plate place the cathode and anode compartments in communication with one another. Electrolyte is fed intermittently or continuously into the system through suitable inlets such as 202 and spent electrolyte is withdrawn through outlet 204 or drain 205. Suitable ports (not shown) are provided for replenishing the supply of scrap on base 270. Any residue remaining on the base 270 may be removed through a cleanout plug (not shown) in intermittent operation, or with electrolyte withdrawn through outlet 205.

In the cell shown in FIGURE 2 the inlet 212 is connected to a supply of an oxidizing agent to be admitted into the cathode portion 222 of the cell in order to regenerate the electrolyte therein, either continuously or intermittently, and inlet 202 provides for the replenishment of sulfuric acid or other electrolyte constituents. A vent 214 and constant level tube 216 (FIGURE 1) assist in the inflow of liquids. The sulfuric acid added is sufficient to maintain the pH between 0.3 and 2.5, preferably at approximately 1.5.

In the cell shown in FIGURE 3 in which flattened tin can consumable anodes stand vertically, the cathode compartment may be packed with glass wool 238 to reduce the movement of electrolyte and to assist in retaining chlorine gas in contact with the electrolyte until the chlorine has reacted. This use of glass wool is a preferred feature which is not, however, essential to the operation of the cell. Porous graphite cathode 234 is provided with a bore 236 through which chlorine or other regenerant material may be admitted into the cell. A glass tube 240 may be inserted into bore 236.

Within a vessel as shown in FIGURES 1 and 2 having inside dimensions of 6" x 4" x 2.75", an anode area of about 24 square inches and a graphite block cathode 5 x 3 x 1.25 inches, a fuel cell has been operated with iron supplied as bar, powder, pellets, scrap or tin cans, for from 100–270 days. The actual E.M.F. obtained on open circuit using the hereinafter described ferric sulfate electrolyte was 0.93 volt and was 0.95 volt using the hereinafter described ferric chloride electrolyte.

Sulfate electrolytes found suitable for the scrap iron-graphite cell described above had the following compositions:

|  | Preferred | Up to a maximum |
|---|---|---|
| $Fe_2(SO_4)_3 \cdot 9H_2O$ | 70 grams | 420 grams. |
| $H_2SO_4$ | 1.5 ml | 9 ml. |
| $H_2O$ | 1,000 ml | 1,000 ml. |

Chloride electrolytes found suitable for the scrap iron-graphite cell described above had the following compositions:

|  | Preferred | Up to a maximum |
|---|---|---|
| $FeCl_3 \cdot 6H_2O$ | 68 grams | 900 grams. |
| HCl | 1.5 ml | 20 ml. |
| $H_2O$ | 1,000 ml | 1,000 ml. |

The cells shown in the drawings are merely representative of apparatus which can be utilized in the practice of this invention. Whether the cathode and anode are located at the top or bottom or sides of the vessel, or elsewhere, is immaterial. The significant factors in their location are (1) that the anode and cathode must be remote from each other, (2) that the electrolyte be introduced to the cathode compartment and (3) that there be a relatively stagnant or quiescent layer of electrolyte about the anode. In the embodiment shown in the drawings this is achieved by means of baffle 218. Any turbulence caused by entry of the electrolyte through inlet tube 202 may be further controlled or diminished, or substantially eliminated by providing a porous carbon cathode, for example, or by inserting a porous plug at the discharge end of tube 202, or by providing a suitable configuration to the discharge end of any liquid admitting tubes.

The spent electrolyte may be regenerated outside of the cell, or advantageously inside of the cell by oxidation with chlorine or hydrogen peroxide. In a preferred system involving regeneration outside of the cell only two-thirds of the spent electrolyte would be regenerated and the remaining one-third of the spent electrolyte would be discharged. For either operation in which the electrolyte is regenerated, the cell may be said to operate overall with iron and either chlorine or hydrogen peroxide as the oxidants.

When a sulfate electrolyte is used as described above, hydrogen peroxide is a preferred oxidant for regenerating electrolyte. The following idealized reactions will serve as useful guides in considering the operation of the cell.

Cell reaction:

$$Fe_2(SO_4)_3 + Fe \rightarrow 3FeSO_4$$

Regeneration reaction:

$$2FeSO_4 + H_2O_2 + H_2SO_4 \rightarrow Fe_2(SO_4)_3 + 2H_2O$$

Thus the ferric sulfate becomes the medium for the following overall reaction:

$$Fe + H_2SO_4 + H_2O_2 \rightarrow FeSO_4 + 2H_2O$$

When a chloride electrolyte is used as described above, chlorine gas is a preferred oxidant for regenerating electrolyte. The following idealized reactions will serve as useful guides in considering the operation of the cell.

Cell reaction:

$$2FeCl_3 + Fe \rightarrow 3FeCl_2$$

Regeneration reaction:

$$2FeCl_2 + Cl_2 \rightarrow 2FeCl_3$$

Thus the ferric chloride becomes the medium for the following overall reaction:

$$Fe + Cl_2 \rightarrow FeCl_2$$

In this system the iron is provided as the consumable electrode (tin cans), the chlorine is admitted through inlet 240 and through a porous cathode, waste product $FeCl_2$ is withdrawn through outlet 204, together with some water which is replenished through inlet 202.

FIGURE 3 shows a fuel cell in which chlorine gas and iron scrap were fed directly into the cell. A cell such as illustrated was operated continuously for 170 hours through a 20 ohm load with no diminution in voltage. The load voltage was 1.03 volts at the end as well as at the beginning of the test. In the cell of FIGURE 3 it is necessary to introduce water into the cell to replace that which leaves with ferrous chloride produced in the cell reaction. The glass wool shown in the cathode chamber is not essential but does serve to hold back chlorine bubbles which might otherwise be inefficiently used in the cell.

Fuel cells in which the regeneration of the oxidant is combined with the generation of electricity have several advantages. No catalyst or special structure is needed to carry on the fuel cell reaction. Indeed the oxidant ($H_2O_2$ or $Cl_2$) need not even touch the cathode for the cell to be effective. However, it is preferred to introduce the regenerant (oxidant) as close to the cathode as possible and as far from the anode, and with a minimum of disturbance to the existing electrolyte.

Porous graphite cathode 234 of FIGURE 3 can be used with similar advantage for the introduction of gaseous or liquid oxidants.

We claim:

1. In an electricity generating cell comprising: a vessel formed of material which is electrically insulating and which is chemically inert towards the content of the vessel; a chemically inert, electrically conductive cathode positioned in said vessel; a consumable oxidizable solid ferrous metal anode material disposed in said vessel and remote from said cathode; leads electrically connected to said anode material and said cathode whereby the electrical output of said cell may be recovered and utilized; and an electrolyte in said vessel; the improvement which comprises: a perforated baffle dividing said vessel into an anode compartment and a cathode compartment and restricting the flow of electrolyte between said two compartments to flow through the perforations in said baffle; said vessel including inlet means located adjacent to said cathode for admitting electrolyte or regenerant for said electrolyte to the cathode compartment of said vessel, said inlet means including means to diminish turbulence during said additions to said cell; and said vessel including outlet means for withdrawal from the anode compartment of said vessel of products of an electrochemical reaction wherein the anode material is oxidized and the electrolyte is reduced at the cathode in said vessel; said inlet means, said outlet means and said perforated plate being located relative to one another so as to maintain the electrolyte adjacent to said anode as a stagnant and quiescent pool of liquid during ingress and egress of electrolyte or regenerant during operation of said cell; said vessel being substantially filled with said electrolyte.

2. The fuel cell of claim 1 wherein the solid ferrous metal consist of flattened tin cans.

3. The fuel cell of claim 1 wherein the electrolyte comprises a solution of ferric sulfate.

4. The fuel cell of claim 1 wherein the electrolyte comprises a solution of ferric chloride.

5. The apparatus of claim 1 in which the cathode is constructed for introducing an oxidant into said cell.

References Cited

UNITED STATES PATENTS

| 368,190 | 8/1887 | Case | 136—84 |
| 913,390 | 2/1909 | Jungner | 136—86 |
| 919,022 | 4/1909 | Jungner | 136—84 |
| 1,426,786 | 8/1922 | Speed et al. | 136—86 X |
| 3,043,898 | 7/1962 | Miller et al. | 136—86 |
| 3,152,013 | 10/1964 | Juda | 136—86 |
| 3,188,241 | 6/1965 | Weiss et al. | 136—86 |
| 3,218,195 | 11/1965 | Corren | 136—86 |

FOREIGN PATENTS 7,189     1886     Great Britain.

ALLEN B. CURTIS, *Primary Examiner.*

WINSTON A. DOUGLAS, *Examiner.*